(12) United States Patent
Harada

(10) Patent No.: US 12,381,229 B2
(45) Date of Patent: Aug. 5, 2025

(54) LITHIUM SECONDARY BATTERY INCLUDING POROUS FILMS LAMINATED ON A NEGATIVE ELECTRODE CURRENT COLLECTOR

(71) Applicant: Panasonic Intellectual Property Management Co., Ltd., Osaka (JP)

(72) Inventor: Tomohiro Harada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 862 days.

(21) Appl. No.: 17/261,945

(22) PCT Filed: Jul. 5, 2019

(86) PCT No.: PCT/JP2019/026869
§ 371 (c)(1),
(2) Date: Jan. 21, 2021

(87) PCT Pub. No.: WO2020/026705
PCT Pub. Date: Feb. 6, 2020

(65) Prior Publication Data
US 2021/0305583 A1    Sep. 30, 2021

(30) Foreign Application Priority Data
Jul. 30, 2018 (JP) .................................. 2018-142299

(51) Int. Cl.
*H01M 4/66* (2006.01)
*H01M 4/485* (2010.01)
(Continued)

(52) U.S. Cl.
CPC ........... *H01M 4/667* (2013.01); *H01M 4/485* (2013.01); *H01M 4/62* (2013.01);
(Continued)

(58) Field of Classification Search
None
See application file for complete search history.

(56) References Cited

U.S. PATENT DOCUMENTS

| | | | |
|---|---|---|---|
| 2013/0017441 A1 | 1/2013 | Affinito et al. | |
| 2015/0280209 A1* | 10/2015 | Ohara | H01M 4/13 429/94 |

(Continued)

FOREIGN PATENT DOCUMENTS

| | | |
|---|---|---|
| EP | 3428998 A1 | 1/2019 |
| JP | 2001-243957 A | 9/2001 |

(Continued)

OTHER PUBLICATIONS

Machine translation of WO 2018056615 A1.*
(Continued)

*Primary Examiner* — Jonathan G Leong
*Assistant Examiner* — Tony S Chuo
(74) *Attorney, Agent, or Firm* — WHDA, LLP

(57) ABSTRACT

A lithium secondary battery, including: a positive electrode; a negative electrode; a non-aqueous electrolyte having lithium ion conductivity; and a separator interposed between the positive electrode and the negative electrode. The positive electrode includes a positive electrode mixture layer containing a positive electrode active material, and a positive electrode current collector. The positive electrode active material includes a composite oxide containing lithium and a transition metal. A molar ratio: $M_{Li}/M_{TM}$ of a total lithium amount per unit area $M_{Li}$ in the positive electrode and the negative electrode to a transition metal amount per unit area $M_{TM}$ in the positive electrode is 1.1 or less. The negative electrode includes a negative electrode current collector, and a plurality of porous films laminated on the negative electrode current collector and having electrically insulating properties.

8 Claims, 3 Drawing Sheets

(51) Int. Cl.
  *H01M 4/62* (2006.01)
  *H01M 10/0525* (2010.01)
  *H01M 10/0568* (2010.01)
  *H01M 10/0569* (2010.01)
  *H01M 4/02* (2006.01)

(52) U.S. Cl.
  CPC .............. *H01M 10/0525* (2013.01); *H01M 10/0568* (2013.01); *H01M 10/0569* (2013.01); *H01M 2004/021* (2013.01); *H01M 2300/0025* (2013.01)

(56) References Cited

U.S. PATENT DOCUMENTS

| | | |
|---|---|---|
| 2016/0204476 A1 | 7/2016 | Kobayashi |
| 2017/0244093 A1 | 8/2017 | Fan |
| 2017/0317352 A1 | 11/2017 | Lee et al. |
| 2017/0331152 A1 | 11/2017 | Kim et al. |
| 2020/0127293 A1 | 4/2020 | Son et al. |

FOREIGN PATENT DOCUMENTS

| | | |
|---|---|---|
| JP | 2014-520370 A | 8/2014 |
| JP | 2017-199678 A | 11/2017 |
| KR | 10-2018032168 | 3/2018 |
| WO | 2012/174393 A1 | 12/2012 |
| WO | 2015/030230 A1 | 3/2015 |
| WO | 2018/056615 A1 | 3/2018 |

OTHER PUBLICATIONS

The Extended European Search Report dated Oct. 4, 2021, issued in counterpart EP Application No. 19844431.7. (9 pages).
International Search Report dated Oct. 1, 2019, issued in counterpart application No. PCT/JP2019/026869 (2 pages).
English Translation of Search Report dated Oct. 16, 2024, issued in counterpart CN Application No. 201980047592.3. (3 pages).

* cited by examiner

LITHIUM SECONDARY BATTERY INCLUDING POROUS FILMS LAMINATED ON A NEGATIVE ELECTRODE CURRENT COLLECTOR

TECHNICAL FIELD

The present invention relates to an improvement of a lithium secondary battery.

BACKGROUND ART

Non-aqueous electrolyte secondary batteries are used for ICT devices, such as personal computers and smart phones, automobiles, power storage systems, and other applications. For the non-aqueous electrolyte secondary batteries used for such applications, further improvement in their capacity has been required. One known example of a high-capacity non-aqueous electrolyte secondary battery is a lithium ion battery. A high capacity of the lithium ion battery can be achieved by, for example, using graphite and an alloy-type active material, such as a silicon compound, in combination as a negative electrode active material. However, the improvement in capacity of the lithium ion battery is approaching to the limit.

As a non-aqueous electrolyte secondary battery superior in capacity to the lithium ion battery, a lithium secondary battery (lithium metal secondary battery) is seen as promising. In the lithium secondary battery, lithium metal deposits on the negative electrode during charge, and the deposited lithium metal dissolves in the non-aqueous electrolyte during discharge. In the lithium secondary battery, in some cases, lithium metal deposits in the form of dendrites on the negative electrode during charge. Furthermore, as the dendrites grow, the specific surface area of the negative electrode increases, which in some cases causes side reactions to increase. Therefore, the discharge capacity and the cycle characteristic tend to deteriorate.

For suppressing the growth of dendrites, Patent Literature 1 teaches to provide a negative electrode containing lithium with a protective film containing a polymer material having lithium ion conductivity.

CITATION LIST

Patent Literature

[PTL 1] International Publication No. WO 2015/030230

SUMMARY OF INVENTION

Technical Problem

According to the technique taught by Patent Literature 1, however, lithium metal may deposit during charge between the protective film and the separator. Moreover, the protective film as above tends to deteriorate as charge and discharge cycles proceed. Consequently, in some cases, lithium becomes deposited in the form of dendrites so as to break through the protective film.

In view of the above, one aspect of the present invention relates to a lithium secondary battery, including: a positive electrode; a negative electrode; a non-aqueous electrolyte having lithium ion conductivity; and a separator interposed between the positive electrode and the negative electrode, wherein the positive electrode includes a positive electrode mixture layer containing a positive electrode active material, and a positive electrode current collector; the positive electrode active material includes a composite oxide containing lithium and a transition metal; a molar ratio: $M_{Li}/M_{TM}$ of a total lithium amount per unit area $M_{Li}$ in the positive electrode and the negative electrode to a transition metal amount per unit area $M_{TM}$ in the positive electrode is 1.1 or less; and the negative electrode includes a negative electrode current collector, and a plurality of porous films laminated on the negative electrode current collector and having electrically insulating properties.

According to the lithium secondary battery of the present invention, the deposition of lithium in the form of dendrites can be suppressed.

DESCRIPTION OF EMBODIMENTS

Figure 1:
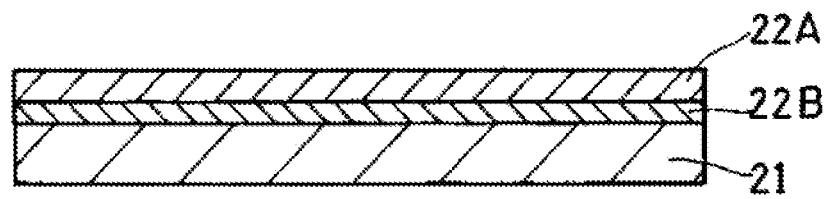
FIG. 1 A schematic cross-sectional view of a negative electrode immediately after battery fabrication according to an embodiment of the present invention.

A lithium secondary battery according to the present invention includes a positive electrode, a negative electrode, a non-aqueous electrolyte having lithium ion conductivity, and a separator disposed between the positive electrode and the negative electrode. The positive electrode includes a positive electrode mixture layer containing a positive electrode active material, and a positive electrode current collector. The positive electrode active material includes a composite oxide containing lithium and a transition metal. The negative electrode includes a negative electrode current collector, and a plurality of porous films laminated on the negative electrode current collector and having electrically insulating properties.

Here, a molar ratio: $M_{Li}/M_{TM}$ of a total lithium amount per unit area $M_{Li}$ in the positive electrode and the negative electrode to a transition metal amount per unit area $M_{TM}$ in the positive electrode is 1.1 or less. This means that the negative electrode, immediately after fabrication, has substantially no lithium metal that can be discharged. In other words, the negative electrode includes a negative electrode current collector, but may not include a negative electrode active material layer. This increases the volume energy density of the battery. Note that in a fully discharged state also, the molar ratio: $M_{Li}/M_{TM}$ is 1.1 or less.

A fully discharged state of the lithium secondary battery refers to a state in which, given that the rated capacity of the battery is denoted by C, the battery is discharged to a state of charge (SOC) of equal to or less than C multiplied by 0.05. For example, when the battery is discharged at a constant current of 0.05 C to a lower limit voltage, it is referred to as being in a fully discharged state. The lower limit voltage is, for example, 2.5 V to 3.0 V.

In the lithium secondary battery, lithium metal deposits on a surface of the negative electrode current collector during charge. Specifically, lithium ions contained in the non-aqueous electrolyte receive electrons on the negative electrode current collector during charge and become lithium metal, which deposits on the surface of the negative electrode current collector. With the negative electrode according to the present embodiment, the deposition place of lithium metal can be controlled to between the surface of the negative electrode current collector and the porous film. Therefore, formation of dendrites can be suppressed. Thus, the expansion of the negative electrode due to the deposition of lithium metal tends to be suppressed.

Although the reason why the deposition place of lithium metal is controlled is unclear, it can be presumed as follows. The plurality of porous films included in the negative electrode are formed so as to be in contact with each other. Each of these porous films has through-holes passing from one to the other principal surface. The lithium ions contained in the non-aqueous electrolyte therefore migrate through the through-holes in each porous film and reach the surface of the negative electrode current collector, where they receive electrons. It is to be noted that in the present embodiment, there are at least two porous films. The positions of the through-holes are, in many cases, different from one film to another, and there are almost no through-holes that can communicate with each other through all the porous films. Consequently, even if the lithium metal formed by receiving electrons from the negative electrode current collector enters the through-holes of the porous film arranged on the negative electrode current collector side (e.g., a second porous film described later), it cannot enter far into the through-holes of the porous film arranged on the separator side (e.g., a first porous film, and further a third porous film described later). Thus, the deposition of lithium metal is unlikely to occur on the separator-facing surface of the outermost porous film.

Furthermore, each porous film has electrically insulating properties. Therefore, only the lithium ions having reached the surface of the negative electrode current collector receive electrons, where they deposit as lithium metal. Thus, the deposition of lithium metal is also unlikely to occur inside the through-holes of the porous film arranged on the negative electrode current collector side. As a result, the deposition place of lithium metal is controlled between the surface of the negative electrode current collector and the porous film disposed on the negative electrode current collector side.

In addition, the presence of a plurality of porous films lengthens the migration distance of lithium ions, allowing the lithium ions to diffuse more in the plane direction of the negative electrode current collector. As a result, the deposition place of lithium metal is less concentrated, allowing lithium metal to deposit dispersedly and bulky.

Usually, the negative electrode is larger in size than the positive electrode, and part of the principal surface of the negative electrode current collector does not face the positive electrode mixture layer. Lithium metal tends to deposit on a portion facing the positive electrode mixture layer of the negative electrode current collector. Therefore, each porous film may have a region (facing region) facing the positive electrode mixture layer.

In view of more effectively suppressing the dendrite formation, at least one porous film may have, in addition to the facing region, a non-facing region not facing the positive electrode mixture layer. The at least one porous film may be formed on all over the principal surface disposed on the positive electrode side of the negative electrode current collector.

When at least one porous film has the facing region and the non-facing region, even in a charged state, the contact is maintained between the non-facing region of one of the porous films and the negative electrode current collector. This restricts the separated distance between the facing region of the porous film disposed on the negative electrode current collector side and the negative electrode current collector, so that lithium metal deposits while being pressed moderately. Although the reason why the dendrite growth is suppressed by being pressed is unclear, it can be presumed as follows. When lithium metal deposits, the growth of lithium metal is restricted in the thickness (Z-axis) direction of the negative electrode current collector, while no restriction is imposed on the growth in the surface (X-Y plane) direction of the negative electrode current collector. Therefore, as compared with the case where lithium metal is allowed to freely grow three-dimensionally in the X-Y plane direction and the Z-axis direction, the lithium ions hardly diffuse in the Z-axis direction, and the growth of dendrites tends to be further suppressed. Physically, too, the growth of lithium metal in the Z-axis direction is suppressed.

Figure 2:
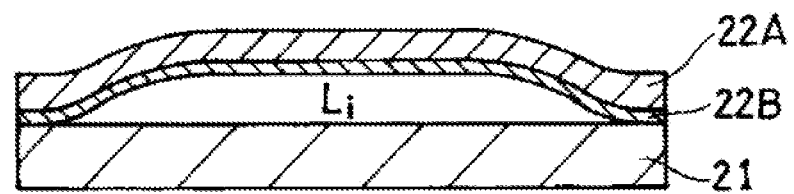
FIG. 2 A schematic cross-sectional view of a negative electrode in a charged state according to an embodiment of the present invention.

FIG. 1 is a schematic cross-sectional view of a negative electrode immediately after battery fabrication according to the present embodiment. FIG. 2 is a schematic cross-sectional view of a negative electrode in a charged state according to the present embodiment. In FIG. 2, the non-facing region is arranged at both ends of a negative electrode current collector 21. The illustrated example shows the negative electrode in an unwound state. The through-holes are not shown.

A negative electrode 20 includes the negative electrode current collector 21, a first porous film 22A disposed on the separator side, and a second porous film 22B disposed between the first porous film 22A and the negative electrode current collector 21. As illustrated in FIG. 1, the first porous film 22A and the second porous film 22B are in contact with each other, and the second porous film 22B and the negative electrode current collector 21 are in contact with each other.

As the lithium secondary battery is charged, as illustrated in FIG. 2, lithium metal (Li) gets deposited between the negative electrode current collector 21 and the second porous film 22B. However, the contact between the negative electrode current collector 21 and the non-facing region of the second porous film 22B is maintained. Therefore, as described above, the separated distance between the negative electrode current collector 21 and the facing region of the second porous film 22B is restricted, and lithium metal Li deposits while being pressed moderately. Even in a charged state, the first porous film 22A and the second porous film 22B are kept in contact with each other.

A detailed description will be given below of the configuration of the lithium secondary battery.

(Negative Electrode)

The negative electrode is an electrode on which lithium metal deposits during charge. The lithium metal deposited on a surface of the negative electrode current collector dissolves as lithium ions in the non-aqueous electrolyte during discharge. The lithium metal thus deposited is formed from lithium ions in the non-aqueous electrolyte. The lithium ions contained in the non-aqueous electrolyte may be either derived from a lithium salt added to the non-aqueous electrolyte, or supplied from the positive electrode active material during charge, or both. Also, the lithium ions may be derived from a lithium salt included in a raw material (see below) used for producing a porous film.

The negative electrode includes a negative electrode current collector and a plurality of porous films. Each of the porous films has electrically insulating properties and is provided with at least one through-hole passing from one principal surface on the separator side to the other principal surface on the negative electrode current collector side. The porous film is disposed on at least one principal surface of the negative electrode current collector. Although an interface can be observed at the boundary between the porous films, it is difficult to separate them from each other. The porous film, however, is separable from the separator.

The porous film may be composed of any electrically insulating material. Examples of the insulating material include fluorocarbon resin, such as polytetrafluoroethylene (PTFE), polyvinylidene fluoride (PVdF), a copolymer of vinylidene fluoride and hexafluoropropylene (VdF-HFP), and a copolymer of vinylidene fluoride and ethylene trifluoride (VdF-TrFE), polyacrylonitrile (PAN), polyimide resin, acrylic resin, polyolefin resin, urethane resin, polycarbonate resin, and epoxy resin. In view of the swellability with non-aqueous electrolyte, the protective film preferably contains a fluorocarbon resin having a unit ($—CH_2—CF_2—$) derived from vinylidene fluoride. Preferable examples of the insulating material as above include PVdF, VdF-HFP, and VdF-TrFE.

The through-hole may have any diameter that allows lithium ions to pass therethrough. The average diameter of the through-holes may be, for example, 100 nm or more and 1000 nm or less, and may be 200 nm or more and 800 nm or less. The size relationship between the through-holes (first through-holes) of the porous film (first porous film) disposed on the separator side and the through-holes (second through-holes) of the porous film (second porous film) disposed on the negative electrode current collector side is not limited. In view of the ease of controlling the deposition place of lithium metal, the average diameter of the second through-holes may be smaller than that of the first through-holes.

The average diameter of the through-holes is an average of the diameters of the through-holes as measured within a 2-mm-square region when the principal surface of the porous film is viewed in the normal direction. The average diameter of the through-holes may be calculated from a cross section in the thickness direction of the negative electrode. For example, with respect to 10 through-holes randomly selected on a 10-mm-long cross section taken along the thickness direction of the negative electrode, the width is measured, and an average thereof can be determined as the average diameter of the through-holes. The width of the through-hole is a length orthogonal to the thickness direction of the negative electrode. The width of the through-hole may be measured using a scanning electron microscope (SEM).

The porous film may have any thickness. In view of achieving a high capacity, desirably, the thickness of the entire porous film is not excessively large. On the other hand, the porous film is desirably thick enough to withstand the expansion and contraction of the negative electrode during charge and discharge. The thickness of the whole porous film may be, for example, 0.1 μm or more and 5 μm or less, and may be 0.5 μm or more and 2.5 μm or less. The thickness of the whole porous film is the sum of the thicknesses of the first and second porous films on one principal surface side of the negative electrode current collector, and further the thickness of a third porous film described later.

The first porous film may have a thickness (first thickness) equal to or greater than a thickness (second thickness) of the second porous film. In this case, even when the negative electrode repeatedly expands and contracts, the first porous film arranged on the separator side is hardly damaged. Therefore, the lithium metal is prevented from entering the first porous film, and thus from depositing in the form of dendrites. The first thickness may be 1.1 times or more, 1.3 times or more, and 1.5 times or more as thick as the second thickness.

The first thickness may be, for example, 0.1 μm or more and 2 μm or less, and may be 0.5 μm or more and 1 μm or less. The second thickness may be, for example, 0.1 μm or more and 1 μm or less, and may be 0.1 μm or more and 0.7 μm or less.

The thickness of the porous film can be determined as an average of the thicknesses at any five points in the above cross section of the negative electrode. The thickness of the porous film is the length of the porous film in the thickness direction of the negative electrode.

A third porous film having electrically insulating properties may be disposed between the first porous film and the second porous film. The third porous film is also provided with at least one through-hole passing from its one principal surface on the separator side to the other principal surface on the negative electrode current collector side.

The third porous film may have two or more layers. The third porous film is formed of, for example, an electrically insulating material as described above. The third porous film may have any thickness (third thickness). The third thickness may be set as appropriate, so that the thickness of the whole porous film falls within, for example, the above-described range.

The negative electrode includes a negative electrode current collector formed of a metal material that does not react with lithium metal.

Examples of the metal material constituting the negative electrode current collector include copper (Cu), nickel (Ni), iron (Fe), and alloys containing any of these metal elements. Preferable examples of the alloys include a copper alloy and stainless steel (SUS). Among the metal materials, copper and/or a copper alloy is preferable in terms of its electrical conductivity. The copper content in the negative electrode current collector is preferably 50 mass % or more, and may be 80 mass % or more. The metal material is in the form of, for example, foil. The negative electrode current collector may have any thickness, and the thickness is, for example, 5 μm to 20 μm.

[Method of Producing Porous Film]

The porous film can be formed by applying a raw material liquid of the porous film onto at least one principal surface of the negative electrode current collector. The negative electrode can be produced by a method including, for example, a first step of preparing a negative electrode current collector, a second step of forming a second porous film by applying a raw material liquid (second raw material liquid) of the second porous film onto at least one principal surface of the negative electrode current collector, followed by drying, and a third step of forming a first porous film by applying a raw material liquid (first raw material liquid) of the first porous film onto the principal surface of the negative electrode current collector with the second porous film formed thereon, followed by drying.

In the case of forming the third porous film, a fourth step is performed after the second step and before the third step, the fourth step forming a third porous film by applying a raw material liquid (third raw material liquid) of the third porous film onto the surface of the second porous film, followed by drying. In this case, in the third step, the first raw material liquid is applied onto the principal surface of the negative electrode current collector, via the second porous film and the third porous film.

Each raw material liquid includes, for example, the above-described insulating material and a solvent. The solvent may include a good solvent that is highly miscible with the insulating material used, and a poor solvent that is poorly miscible with the insulating material used. Alternatively, a good solvent that is highly miscible with the insulating material used may be used in combination with at least one salt selected from the group consisting of lithium salts and normal temperature molten salts (hereinafter, sometimes collectively referred to as the salt).

When a good solvent and a poor solvent are used, separation occurs in the applied film between a region containing the insulating material and the good solvent and a region containing the poor solvent. When separated, the region containing the poor solvent is distributed so as to be interposed between the regions containing the insulating material. Subsequent drying to remove the solvent forms through-holes between the regions containing the insulating material, and further forms non-through holes. The pore diameter, porosity, and other properties of the resulting porous film are dependent on, for example, the type of the solvent, and the mass ratio of the good solvent to the poor solvent.

When a good solvent and a salt are used, separation occurs in the applied film between a region containing the insulating material, the good solvent, and the salt, in which the concentration of the insulating material is high, and a region containing the insulating material and the good solvent, in which the concentration of the insulating material is lower. Subsequent drying to remove the solvent forms through-holes so as to correspond to the region in which the concentration of the insulating material is lower, and further forms non-through holes. At this time, the salt remains in the porous film. The pore diameter, porosity, and other properties of the resulting porous film are dependent on, for example, the type and concentration of the salt.

The good solvent and the poor solvent may be selected as appropriate depending on the insulating material used. In the case of using a good solvent and a poor solvent in combination, the good solvent and the poor solvent may have boiling points that differ from each other by, for example, 10° C. or more. Examples of the solvent include N-methyl-2-pyrrolidone (NMP).

The lithium salt may be, for example, any known lithium salt used for a non-aqueous electrolyte of lithium secondary batteries. Specific examples thereof include: lithium salt anions, such as $BF_4^-$, $ClO_4^-$, $PF_6^-$, $CF_3SO_3^-$, and $CF_3CO_2^-$, oxalate anions, and imide anions described later as anions of room-temperature molten salts. The oxalate anions may contain boron and/or phosphorus. The oxalate anions may be an anion of an oxalate complex. Examples of the oxalate anions include difluorooxalate borate ($BF_2(C_2O_4)^-$), bisoxalate borate ($B(C_2O_4)_2^-$), $B(CN)_2(C_2O_4)^-$, $PF_4(C_2O_4)^-$, and $PF_2(C_2O_4)_2^-$. The lithium salt can be used singly or in combination of two or more kinds.

The room-temperature molten salt is liquid at room temperature (20° C. to 40° C.), which is also referred to as an ionic liquid.

The room-temperature molten salt may be a salt of an organic onium cation and an imide anion, for facilitating pore formation. The room-temperature molten salt can be used singly or in combination of two or more kinds.

Examples of the organic onium cation include: cations derived from aliphatic amines, alicyclic amines, or aromatic amines (e.g., quaternary ammonium cation); organic onium cations having a nitrogen-containing hetero ring (i.e., cations derived from cyclic amines); sulfur-containing onium cations; and phosphorus-containing onium cations (e.g., quaternary phosphonium cation). The organic onium cation may have a functional group, such as a hydroxyl group (—OH) or a silanol group (—Si—OH), and may have a divalent group derived from silanol or the like (e.g., —SiO—).

Particularly preferred is a cation having a nitrogen-containing hetero ring, in view of the heat resistance. The nitrogen-containing hetero ring skeleton may be, for example, pyrrolidine, imidazoline, imidazole, pyridine, or piperidine. Specific examples of the cation include N-methyl-N-propyl piperidinium cation, N,N,N-trimethyl-N-propylammonium cation, and 1-methyl-1-propylpyrrolidinium cation.

Examples of the imide anions include $N(SO_2C_mF_{2m+1})(SO_2C_nF_{2n+1})^-$, where m and n are each independently an integer of 0 or more. Here, m and n may be each independently 0 to 3, and 0, 1 or 2. Specific examples of the imide anions include bistrifluoromethylsulfonyl imide anion ($N(SO_2CF_3)_2^-$, TFSI⁻), bisperfluoroethylsulfonyl imide anion ($N(SO_2C_2F_5)_2^-$), bis(fluorosulfonyl)imide anion ($N(SO_2F)_2^-$). Preferred are bis(fluorosulfonyl)imide anion and TFSI⁻.

The salt may be contained in the raw material liquid at any concentration, and the concentration may be set as appropriate depending on the pore size, the porosity and the like of the porous film to be formed. For example, the concentration of the salt may be 0.5 mass % to 30 mass %, and may be 1 mass % to 10 mass %.

The insulating material also may be contained in the raw material liquid at any concentration, and the concentration may be set as appropriate depending on the thickness and the like of the porous film to be formed. The concentration of the insulating material may be, for example, 3 mass % to 35 mass %, and may be 5 mass % to 15 mass %.

[Positive Electrode]

The positive electrode includes a positive electrode mixture layer containing a positive electrode active material, and a positive electrode current collector. The positive electrode mixture layer can be formed by applying a positive electrode slurry in which a positive electrode mixture including a positive electrode active material, a binder, and an electrically conductive agent are dispersed in a dispersion medium, onto a surface of the positive electrode current collector, followed by drying. The applied film after drying may be rolled, if necessary. The positive electrode mixture layer may be formed on one surface or both surfaces of the positive electrode current collector.

The positive electrode active material may be a composite oxide containing lithium and a transition metal. The molar ratio of the lithium to the transition metal:lithium/transition metal in the composite oxide is, for example, 0.9 to 1.1.

The positive electrode active material as above may be, for example, a composite oxide having a layered rock-salt structure. Specific examples of the positive electrode active material include $Li_aCoO_2$, $Li_aNiO_2$, $Li_aMnO_2$, $Li_aCo_bNi_{1-b}O_2$, $Li_aCo_bM_{1-b}O_c$, $Li_aNi_bM_{1-b}O_c$, and $LiMPO_4$, where M represents at least one selected from the group consisting of Na, Mg, Sc, Y, Mn, Fe, Co, Ni, Cu, Zn, Al, Cr, Pb, Sb, and B. Here, $0<a\leq1.1$, $0\leq b\leq0.9$, and $2\leq c\leq2.3$. Note that "a" representing the molar ratio of lithium is a value immediately after the preparation of the active material and is subjected to increase and decrease during charge and discharge.

Particularly preferred is a nickel-containing composite oxide having a layered rock-salt structure. Examples of the composite oxide include $LiaNi_xM_{1-x}O_2$, where M represents at least one selected from the group consisting of Mn, Co, and Al, $0<a\leq1.1$, and $0.3\leq x\leq1$. In view of achieving a higher capacity, more preferably, $0.85\leq x\leq1$. In view of the stability of the crystal structure, more preferred is a lithium-nickel-cobalt-aluminum composite oxide (NCA) containing Co and Al as elements represented by M: $Li_aNi_xCo_yAl_zO_2$, where $0<a\leq1.1$, $0.85\leq x<1$, $0<y<0.15$, $0<z\leq0.1$, and $x+y+z=1$. Specific examples of NCA include $LiNi_{0.8}Co_{0.15}Al_{0.05}O_2$, $LiNi_{0.8}Co_{0.18}Al_{0.02}O_2$, and $LiNi_{0.9}Co_{0.05}Al_{0.05}O_2$.

The binder may be a resin material, examples of which include: fluorocarbon resin, such as PTFE and PVdF; polyolefin resin, such as polyethylene and polypropylene; polyamide resin, such as aramid resin; polyimide resin, such as polyimide and polyamide-imide; acrylic resin, such as polyacrylic acid, polymethyl acrylate, and ethylene-acrylic acid copolymer; vinyl resin, such as PAN and polyvinyl acetate; polyvinyl pyrrolidone; polyether sulfone; and a rubbery material, such as styrene-butadiene copolymer rubber (SBR). These may be used singly or in combination of two or more kinds.

Examples of the conductive agent include: graphite, such as natural graphite and artificial graphite; carbon blacks, such as acetylene black; conductive fibers, such as carbon fibers and metal fibers; fluorinated carbon; metal powders, such as aluminum; conductive whiskers, such as zinc oxide and potassium titanate; conductive metal oxides, such as titanium oxide; and organic conductive materials, such as phenylene derivatives. These may be used singly or in combination of two or more kinds.

The form and the thickness of the positive electrode current collector may be respectively selected from the forms and the ranges corresponding to those of the negative electrode current collector. The positive electrode current collector may be made of, for example, stainless steel, aluminum (Al), an aluminum alloy, and titanium.

[Non-Aqueous Electrolyte]

The non-aqueous electrolyte used herein has lithium ion conductivity. The non-aqueous electrolyte contains a non-aqueous solvent, and lithium ions and anions dissolved in the non-aqueous solvent. The non-aqueous electrolyte may be in the form of liquid or gel.

The non-aqueous electrolyte in the form of liquid is prepared by dissolving a lithium salt in anon-aqueous solvent. When the lithium salt is dissolved in the non-aqueous solvent, lithium ions and anions are produced. In the non-aqueous electrolyte, however, some undissociated lithium salt may be present.

The non-aqueous electrolyte in the form of gel includes a liquid non-aqueous electrolyte and a matrix polymer. The matrix polymer is, for example, a polymer material that is gelated by absorbing the non-aqueous solvent. Examples of the polymer material include a fluorocarbon resin, an acrylic resin, and/or a polyether resin.

The lithium salt may be any known lithium salt used for non-aqueous electrolyte of lithium secondary batteries. Specific examples thereof include compounds exemplified as a lithium salt used for forming a porous film. The non-aqueous electrolyte may contain one or more kinds of these lithium salts.

In view of further suppressing the dendritic deposition of lithium metal, the non-aqueous electrolyte may contain at least one selected from the group consisting of imide anions and anions of boron-containing oxalates. Particularly preferred are anions of boron-containing oxalates. The anions of boron-containing oxalates may be used in combination with one or more other anions. The other anions may be $PF_6^-$ and/or imide anions.

A lithium salt concentration in the non-aqueous electrolyte may be, for example, 0.5 mol/L or more and 3.5 mol/L or less. The lithium salt concentration is a sum of the concentrations of the dissociated lithium salt and the undissociated lithium salt. The anion concentration in the non-aqueous electrolyte may be set to 0.5 mol/L or more and 3.5 mol/L or less.

Examples of the non-aqueous solvent include esters, ethers, nitriles, amides, and halogen substituents of these. The non-aqueous electrolyte may contain one or more kinds of these non-aqueous solvents. Examples of the halogen substituent include fluorides.

Examples of the ester include carbonic esters and carboxylic acid esters. Examples of cyclic carbonic esters include ethylene carbonate, propylene carbonate, vinylene carbonate, and fluoroethylene carbonate (FEC). Examples of chain carbonic esters include dimethyl carbonate (DMC), ethyl methyl carbonate (EMC), and diethyl carbonate. Examples of cyclic carboxylic acid esters include γ-butyrolactone and γ-valerolactone. Examples of chain carboxylic acid esters include ethyl acetate, methyl propionate, and methyl fluoropropionate.

Examples of the ether include cyclic ethers and chain ethers. Examples of the cyclic ether include 1,3-dioxolane, 4-methyl-1,3-dioxolane, tetrahydrofuran, and 2-methyltetrahydrofuran. Examples of the chain ether include 1,2-dimethoxyethane, diethyl ether, ethyl vinyl ether, methyl phenyl ether, benzyl ethyl ether, diphenyl ether, dibenzyl ether, 1,2-diethoxyethane, and diethylene glycol dimethyl ether.

Examples of the nitrile include acetonitrile, propionitrile, and benzonitrile. Examples of the amide include dimethylformamide and dimethylacetamide.

Particularly preferred are vinylene carbonate and fluoroethylene carbonate, in view of the charge and discharge efficiency. In some cases, these non-aqueous solvents facilitate the dendrite formation. According to the present embodiment, however, lithium metal deposits, while being pressed with the porous film, between the surface of the negative electrode current collector and the second porous film, and therefore, the dendrite formation is suppressed.

[Separator]

The separator is interposed between the positive electrode and the negative electrode. The separator is excellent in ion permeability and has moderate mechanical strength and electrically insulating properties. The separator may be, for example, a microporous thin film, a woven fabric, or a nonwoven fabric. The separator is preferably made of, for example, polyolefin, such as polypropylene or polyethylene.

[Lithium Secondary Battery]

Figure 3:
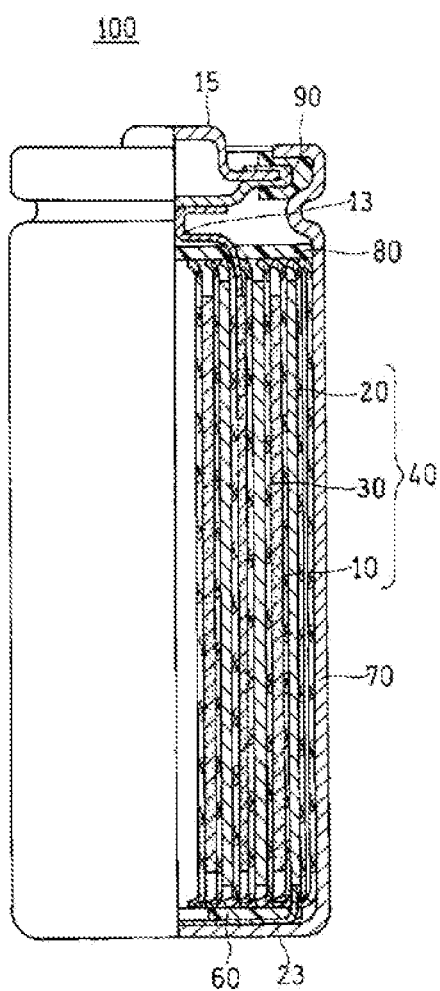
FIG. 3 A schematic cross-sectional view of a lithium secondary battery according to an embodiment of the present invention.

FIG. 3 is a longitudinal cross-sectional view of an example of a cylindrical lithium secondary battery according to the present embodiment.

A lithium secondary battery 100 is a wound battery including a wound electrode group 40 and a non-aqueous electrolyte (not shown). The wound electrode group 40 includes a belt-like positive electrode 10, a belt-like negative electrode 20, and a separator 30. A positive electrode lead 13 is connected to the positive electrode 10, and a negative electrode lead 23 is connected to the negative electrode 20.

The positive electrode lead 13 is connected at its one end in the longitudinal direction to the positive electrode 10 and connected at the other end to a sealing plate 90. The sealing plate 90 is provided with a positive electrode terminal 15. The negative electrode lead 23 is connected at its one end to the negative electrode 20 and connected at the other end to the bottom of a battery case 70 serving as a negative electrode terminal. The battery case 70 is a bottom-closed cylindrical battery can, with one end in the longitudinal direction being open, and the other end being the bottom serving as the negative electrode terminal. The battery case (battery can) 70 is made of metal, and is formed of, for example, iron. The battery case 70 made of iron usually has a nickel-plated inner surface. On the top and the bottom of the wound electrode group 40, an upper insulating ring 80 and a lower insulating ring 60 both made of a resin are respectively disposed.

Although in the illustrated example, the lithium secondary battery has a cylindrical shape and includes a wound electrode, the present embodiment is not limited thereto. The shape of the lithium secondary battery can be selected as appropriate depending on its application, from a cylindrical shape and other various shapes, such as a coin shape, a square shape, a sheet shape, and a flat shape. The form of the electrode group is also not limited, and may be a laminate type.

For the configuration of the components other than the negative electrode of the lithium secondary battery, any known configuration may be applied without limitation.

The present invention will be specifically described below with reference to Examples and Comparative Examples. It should be noted, however, that the present invention is not limited to the following Examples.

Example 1

(1) Production of Positive Electrode

A lithium nickel composite oxide ($LiNi_{0.8}Co_{0.18}Al_{0.02}O_2$), acetylene black, and PVdF were mixed in a mass ratio of 95:2.5:2.5, to which NMP was added. The mixture was stirred in a mixer (T.K. HIVIS MIX, available from PRIMIX Corporation), to prepare a positive electrode slurry. Next, the positive electrode slurry was applied onto each surface of Al foil. The applied film was dried, and then rolled to form a positive electrode with a positive electrode mixture layer having a density of 3.6 $g/cm^3$ formed on both surfaces of the Al foil.

(2) Production of Negative Electrode

An electrolytic copper foil (thickness: 10 μm) was cut in a predetermined electrode size. A raw material liquid containing PVdF (concentration: 8 mass %), LiTFSI (concentration: 1 mass %), and NMP was prepared.

The prepared raw material liquid was applied onto both principal surfaces of the electrolytic copper foil, followed by drying with hot air, to form a second porous film having a second thickness of 0.5 μm on each surface. The prepared raw material liquid was applied onto the surface of each of the second porous films, followed by drying with hot air, to form a first porous film having a first thickness of 0.5 μm on each surface.

A cross section in the thickness direction of the resulting negative electrode was observed with a SEM. The observation confirmed that a plurality of first through-holes having an average diameter of 800 nm were formed in the first porous film. The observation also confirmed that a plurality of second through-holes having an average diameter of 800 nm were formed in the second porous film.

(3) Preparation of Non-Aqueous Electrolyte

FEC, EMC, and DMC were mixed at a volume ratio of FEC:EMC:DMC=20:5:75. In the resulting mixed solvent, lithium difluorooxalate borate and $LiPF_6$ were dissolved respectively at a concentration of 0.3 mol/L and 1.0 mol/L, to prepare a non-aqueous electrolyte.

(4) Fabrication of Battery

To the positive electrode obtained above, an Al tab was attached. To the negative electrode obtained above, a Ni tab was attached. The positive electrode and the negative electrode were spirally wound with a polyethylene thin film (separator) interposed therebetween in an inert gas atmosphere, to form a wound electrode body. The resulting electrode body was housed in a pouch-form outer case formed of a laminate sheet having an Al layer, into which the above non-aqueous electrolyte was injected. Then, the outer case was sealed, to form a lithium secondary battery T1.

Example 2

A lithium secondary battery T2 was produced in the same manner as in Example 1, except that the first porous film was formed to have the first thickness of 1 μm in the production of negative electrode (2).

Example 3

A lithium secondary battery T3 was produced in the same manner as in Example 1, except that a third porous film composed of two layers (third thickness: 1 μm=0.5 μm×2) was formed between the second porous film and the first porous film in the production of negative electrode (2).

Comparative Example 1

A lithium secondary battery R1 was produced in the same manner as in Example 1, except that the same raw material liquid was used to form a single layer of porous film having a thickness of 2 μm in the production of negative electrode (2).

A cross section of the resulting negative electrode in the thickness direction was observed with the SEM. The observation confirmed that the a plurality of through-holes having an average diameter of 800 nm were formed in the porous film.

Comparative Example 2

A lithium secondary battery R2 was produced in the same manner as in Example 1, except that LiTFSI was not included in the raw material liquid in the production of negative electrode (2).

A cross section of the resulting negative electrode in the thickness direction was observed with the SEM. The observation confirmed that the two layers of film were both non-porous, having no through-holes.

[Evaluation]

The batteries T1 to T3, R1 and R2 obtained above were subjected to a charge-discharge test.

In the charge-discharge test, the batteries were charged under the following conditions in a constant temperature bath at 25° C., and then, after left to stand for 20 min, discharged under the following conditions. With the above charge and discharge regarded as one cycle, 50 cycles of charge and discharge were performed as a charge-discharge test.

(Charge) Constant-current charge was performed at a current of 20 mA until the battery voltage reached 4.1 V, and then constant-voltage charge was performed at a voltage of 4.1 V until the current value reached 2 mA.

(Discharge) Constant-current discharge was performed at a current of 20 mA until the battery voltage reached 3.0 V.

(a) Deposition Place of Lithium Metal and (b) Damage on Negative Electrode

Figure 4A:
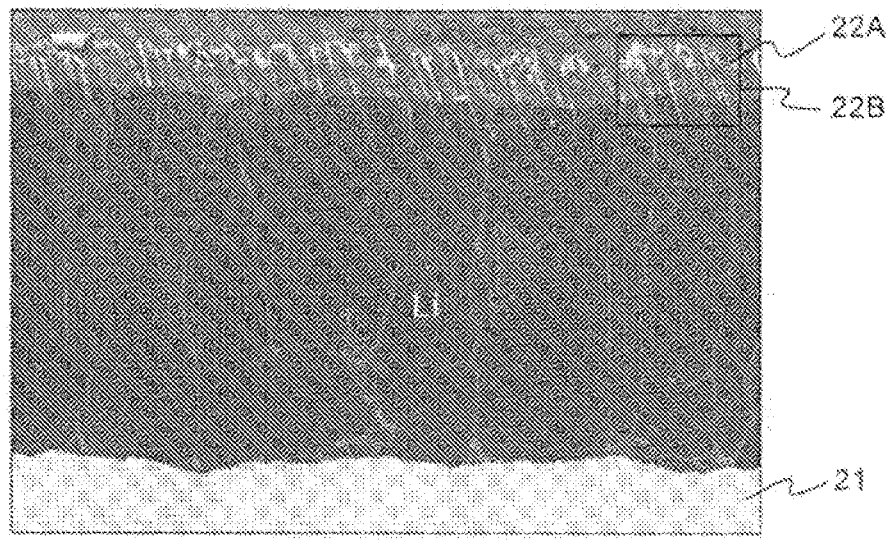
FIG. 4A A SEM image (magnification: ×2500) showing a cross section of a negative electrode of Example 1 after charge.
Figure 4B:
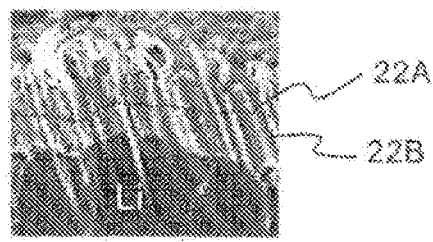
FIG. 4B A partially enlarged view of the SEM image of FIG. 4A.
Figure 5:
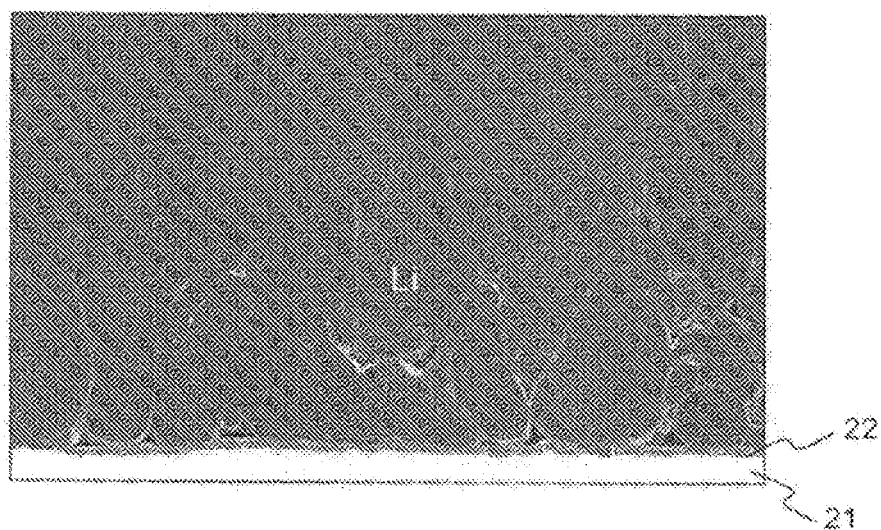
FIG. 5 A SEM image (magnification: ×2500) showing a cross section of a negative electrode of Comparative Example 1 after charge.

After subjected to 50 cycles of charge and discharge, the batteries were disassembled to take out the negative electrodes. The negative electrodes were each cut in the thickness direction to reveal a cross section, which was observed with a scanning electron microscope (SEM). The evaluation results are shown in Table 1. FIG. 4A is a SEM image (magnification: ×2500) showing a cross section of the negative electrode taken out from the battery T1. FIG. 4B is a partially enlarged view of the SEM image of FIG. 4A. In FIG. 4B, for the sake of convenience, the interface between the first porous film 22A and the second porous film 22B is shown by a broken line. According to FIGS. 4A and 4B, lithium metal (Li) is deposited between the negative electrode current collector 21 and the second porous film 22B. FIG. 5 is a SEM image (magnification: ×2500) showing a cross section of the negative electrode taken out from the battery R1. According to FIG. 5, lithium metal (Li) is deposited on the principal surface not facing the negative electrode current collector 21 (the principal surface facing the separator (not shown)) of the porous film 22.

(c) Capacity Retention Rate

A discharge capacity at the 50th cycle divided by a discharge capacity at the 1st cycle was determined as a capacity retention rate (%). The evaluation results are shown in Table 1.

TABLE 1

|  |  | Battery T1 | Battery T2 | Battery T3 | Battery R1 | Battery R1 |
|---|---|---|---|---|---|---|
| Porous film | First (μm) | 0.5 | 1 | 0.5 | 2 | — |
|  | Second (μm) | 0.5 | 0.5 | 0.5 | — | — |
|  | Third (μm) | — | — | 0.5 × 2 | — | — |
| Non-porous film (μm) |  | — | — | — | — | 0.5 × 2 |
| Deposition place |  | Between negative electrode current collector and second porous film | | | Between film and separator | |
| Damage on film |  | None | None | None | Damaged | Damaged |
| Capacity retention rate (%) |  | 66.0 | 67.0 | 63.5 | 62.1 | 60.1 |

Table 1 shows that in all of the batteries T1 to T3, the deposition place of lithium metal was controlled between the negative electrode current collector and the second porous film, and the capacity retention rate was high. On the other hand, in the batteries R1 and R2, the porous film or the non-porous film was damaged, and lithium metal was deposited between each film and the separator. Furthermore, part of the deposited lithium metal was in the form of dendrites. Moreover, the capacity retention rates were lower than those of the batteries T1 to T3.

INDUSTRIAL APPLICABILITY

The lithium secondary battery of the present invention is excellent in discharge capacity and cycle characteristics, and are therefore suitably applicable for electronic devices, such as cellular phones, smart phones, and tablet terminals, electric vehicles including hybrids and plug-in hybrids, and home storage battery systems combined with a solar cell.

REFERENCE SIGNS LIST 10 positive electrode
13 positive electrode lead
15 positive electrode terminal
20 negative electrode
21 negative electrode current collector
22A first porous film
22B second porous film
23 negative electrode lead
30 separator
40 wound electrode group
60 lower insulation ring
70 battery case
80 upper insulating ring
90 sealing plate
100 lithium secondary battery
22 porous film

The invention claimed is:

1. A lithium secondary battery, comprising: a positive electrode; a negative electrode; a non-aqueous electrolyte having lithium ion conductivity; and a separator interposed between the positive electrode and the negative electrode, wherein
the positive electrode includes a positive electrode mixture layer containing a positive electrode active material, and a positive electrode current collector;
the positive electrode active material includes a composite oxide containing lithium and a transition metal;
a molar ratio: $M_{Li}/M_{TM}$ of a total lithium amount per unit area $M_{Li}$ in the positive electrode and the negative electrode to a transition metal amount per unit area $M_{TM}$ in the positive electrode is 1.1 or less; and
the negative electrode includes a negative electrode current collector, and a plurality of porous films laminated on the negative electrode current collector and having electrically insulating properties,
wherein the plurality of porous films each have a facing region facing the positive electrode mixture layer in a thickness direction of the negative electrode current collector,
at least one of the plurality of porous films has a non-facing region not facing the positive electrode mixture layer in the thickness direction of the negative electrode current collector, the non-facing region different from the facing region of the at least one of the plurality of porous films,
at least part of the non-facing region, in a charged state, is configured to be in direct contact with the negative electrode current collector, while at least part of the facing region, in the charged state, is configured to lack direct contact with the negative electrode current collector, lithium metal is configured to deposit on a surface of the negative electrode current collector in the charged state, and the plurality of porous films includes a first porous film, and a second porous film disposed between the first porous film and the negative electrode current collector, the first porous film has first through-holes each passing from one principal surface to another principal surface thereof, and the second porous film has second through-holes each passing from one principal surface to another principal surface thereof, and an average diameter of the second through-holes is smaller than an average diameter of the first through-holes.

2. The lithium secondary battery according to claim 1, wherein the plurality of porous films include a first porous film, and a second porous film disposed between the first porous film and the negative electrode current collector, and the first porous film has a thickness equal to or greater than a thickness of the second porous film.

3. The lithium secondary battery according to claim 2, wherein the first porous film has a thickness of is 0.1 μm or more and 2 μm or less, and the second porous film has a thickness of 0.1 μm or more and 1 μm or less.

4. The lithium secondary battery according to claim 1, wherein at least one of the plurality of porous films includes a polymer having a unit derived from vinylidene fluoride.

5. The lithium secondary battery according to claim 1, wherein at least one of the plurality of porous films includes at least one salt selected from the group consisting of lithium salts and room-temperature molten salts.

6. The lithium secondary battery according to claim 1, wherein the non-aqueous electrolyte includes at least one of fluoroethylene carbonate and vinylene carbonate.

7. The lithium secondary battery according to claim 1, wherein the non-aqueous electrolyte contains lithium ion and an anion, and the anion includes at least one selected from the group consisting of imide anions and oxalate anions containing boron.

8. The lithium secondary battery according to claim 7, wherein the imide anion is at least one of bis(fluorosulfonyl) imide anion and bistrifluoromethylsulfonyl imide anion.

* * * * *